United States Patent [19]

Moffatt et al.

[11] Patent Number: 5,083,834
[45] Date of Patent: * Jan. 28, 1992

[54] TRUCK SLEEPER CAB

[76] Inventors: Eugene V. Moffatt, 831 Douglas Dr.; Raymond H. Moffatt, 3448 Ellwood Rd., both of New Castle, Pa. 16101; Vivian S. Jones, R.D. #2 Frampton Rd., West Middlesex, Pa. 16159; David A. Jones, 2060 Clayfurnace Rd., Sharpsville, Pa. 16150

[*] Notice: The portion of the term of this patent subsequent to Apr. 3, 2007 has been disclaimed.

[21] Appl. No.: 502,873

[22] Filed: Mar. 30, 1990

Related U.S. Application Data

[63] Continuation of Ser. No. 69,837, Jul. 6, 1987, Pat. No. 4,913,485.

[51] Int. Cl.⁵ ................................. B60P 3/32
[52] U.S. Cl. .................. 296/190; 296/39.1; 296/39.3; 52/79.4; 52/309.1
[58] Field of Search ............ 296/166, 190, 901, 39, 296/164, 156, 39.3; 52/79.1, 79.4, 309.1

[56] References Cited

U.S. PATENT DOCUMENTS

| | | | |
|---|---|---|---|
| 2,728,702 | 12/1955 | Simon et al. | 296/901 |
| 2,730,772 | 1/1956 | Jones | 296/901 |
| 3,163,434 | 12/1964 | Krueger | 296/901 |
| 3,586,119 | 6/1971 | Fullerton et al. | 296/166 |
| 3,625,560 | 12/1971 | Bjork | 296/166 |
| 3,817,545 | 6/1974 | Ward | 296/164 |
| 3,879,240 | 4/1978 | Wall | 296/156 |
| 4,121,684 | 10/1978 | Stephens et al. | 296/190 |
| 4,157,021 | 6/1979 | Collins et al. | 296/166 |
| 4,201,415 | 5/1980 | Suchanek | 296/190 |
| 4,378,856 | 4/1983 | Miller | 296/166 |
| 4,491,362 | 1/1985 | Kennedy | 296/901 |
| 4,542,933 | 9/1985 | Bischoff | 296/901 |

FOREIGN PATENT DOCUMENTS

| | | |
|---|---|---|
| 2127862 | 8/1972 | Fed. Rep. of Germany . |
| 2128042 | 12/1972 | Fed. Rep. of Germany . |
| 2572106 | 4/1986 | France . |
| 0107925 | 7/1982 | Japan . |

Primary Examiner—Robert R. Song
Attorney, Agent, or Firm—Klaas & Law

[57] ABSTRACT

A sleeper cab unit for mounting on a truck comprising a one-piece outer shell made of reinforced fibreglass plastic material having core materials laminated to inside surfaces of the shell and with window and door and other openings cut through the shell and insulating materials and wall covering materials affixed to the inside surfaces of the shell.

24 Claims, 4 Drawing Sheets

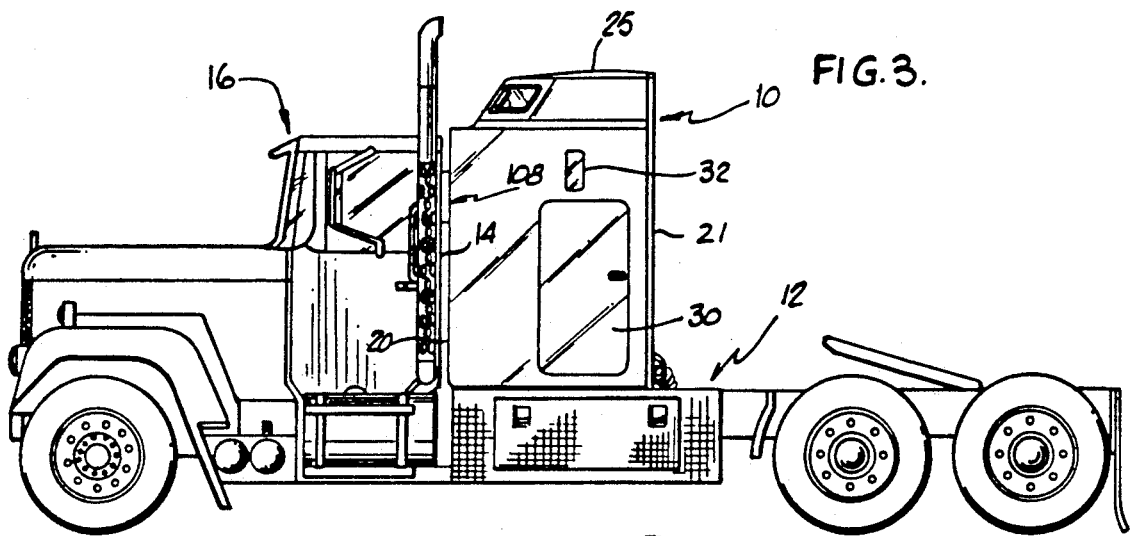
FIG. 3.
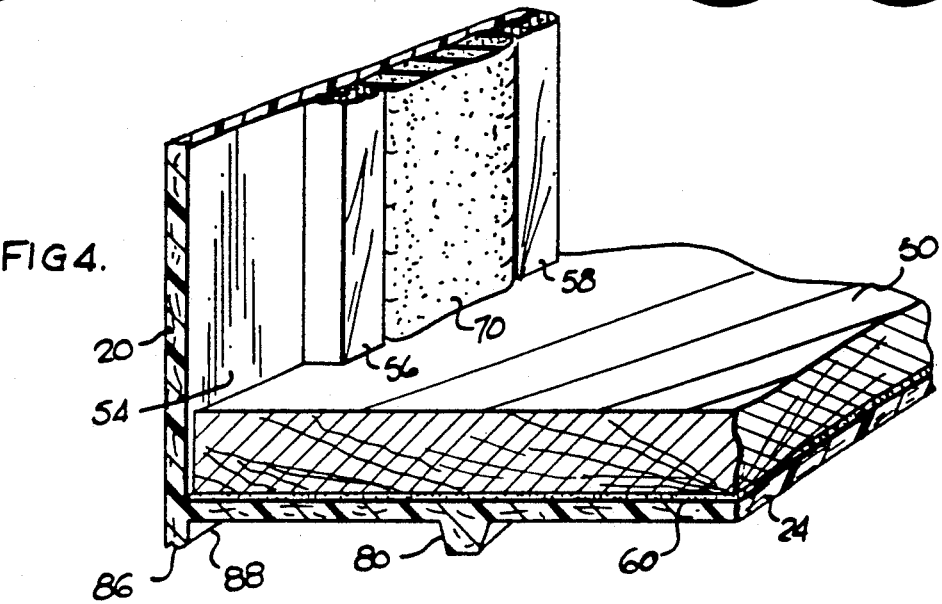
FIG 4.
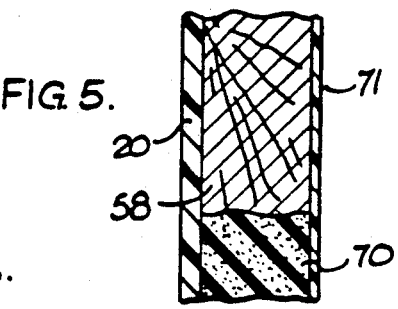
FIG. 5.
FIG. 6.
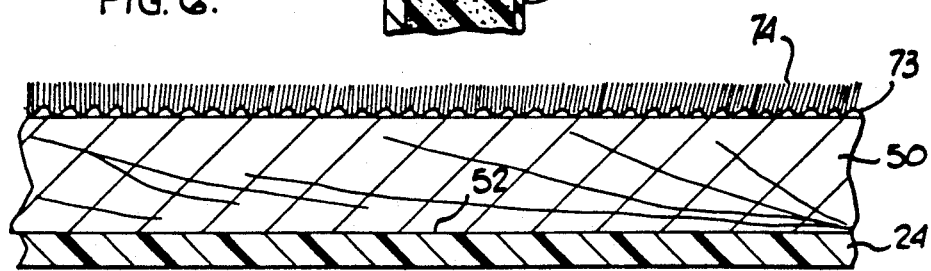

TRUCK SLEEPER CAB

This is a continuation of application Ser. No. 69,837, filed July 6, 1987, now U.S. Pat. No. 913,485.

BACKGROUND & SUMMARY OF INVENTION

This invention relates to cab units, such as sleeper cab unit cabs for use with trucks and the like.

In the past, truck-tractor-trailer rigs used for long distance hauling of goods have sometimes been provided with sleeping compartments for the drivers. The sleeping compartments have been provided in the rear of and as part of the truck cab itself. In other instances, the sleeping compartment has been provided in a separate sleeping cab unit mounted on the truck frame behind the truck cab.

In general, the present invention relates to the construction and methods of construction of sleeping cab units mounted on the truck frame behind the truck cab. The sleeping cab unit comprises a one-piece outer boxlike shell made of fiberglass reinforced plastic materials with core materials integrally bonded to interior surfaces of the shell without joints or seams or separate connecting devices such as rivets and bolts so as to prevent water and air leakage. The sleeping cab unit is of relatively light weight and relatively high strength as compared with prior art units. In addition, wind resistance and the cost of manufacture have been significantly reduced while also providing improved insulation and eliminating vibrational problems. Maintenance problems have been reduced, appearance has been substantially improved and comfort has been greatly increased resulting in less fatigue to the driver and improved safety.

In the presently preferred and illustrative embodiment of the invention, the sleeping cab unit comprises a one-piece box-type shell having a bottom wall portion providing a floor, an upper wall portion providing a roof, front and rear vertically extending side wall portions and a pair of vertically extending side wall portions made of fiberglass reinforced plastic material with lightweight porous core materials integrally bonded to the fiberglass to form a high-strength lightweight solid one-piece integral sleeping cab unit. After forming of the closed shell with the core materials attached thereto, various openings, such as for windows and doors, are cut through the wall portions. The inside of the sleeping cab unit is then finished by mounting of covering materials on the core materials. The inside of the sleeping cab unit may have various built-in accessory structures such as a sleeping bunk or shelf for supporting a mattress, cabinets for storing articles and clothes, receptacles for appliances, such as refrigerators and cooling devices. Other features of the present invention include mounting frame structure for attachment of the sleeping cab to the truck frame, and tunnel means for connection of the truck cab directly to the sleeper cab.

BRIEF DESCRIPTION OF DRAWINGS

Illustrative and presently preferred embodiments of the invention are shown in the accompanying drawing wherein:

FIG. 3 is a side elevational view of the sleeping cab unit as mounted on a truck;

FIG. 4 is a cross-sectional perspective view of a portion of a cab shell showing the floor and side wall construction;

FIG. 5 is a cross-sectional view of a finished side wall portion of the sleeping cab unit;

FIG. 6 is a cross-sectional view of a finished bottom wall portion of the sleeping cab unit;

DETAILED DESCRIPTION

Figure 1:
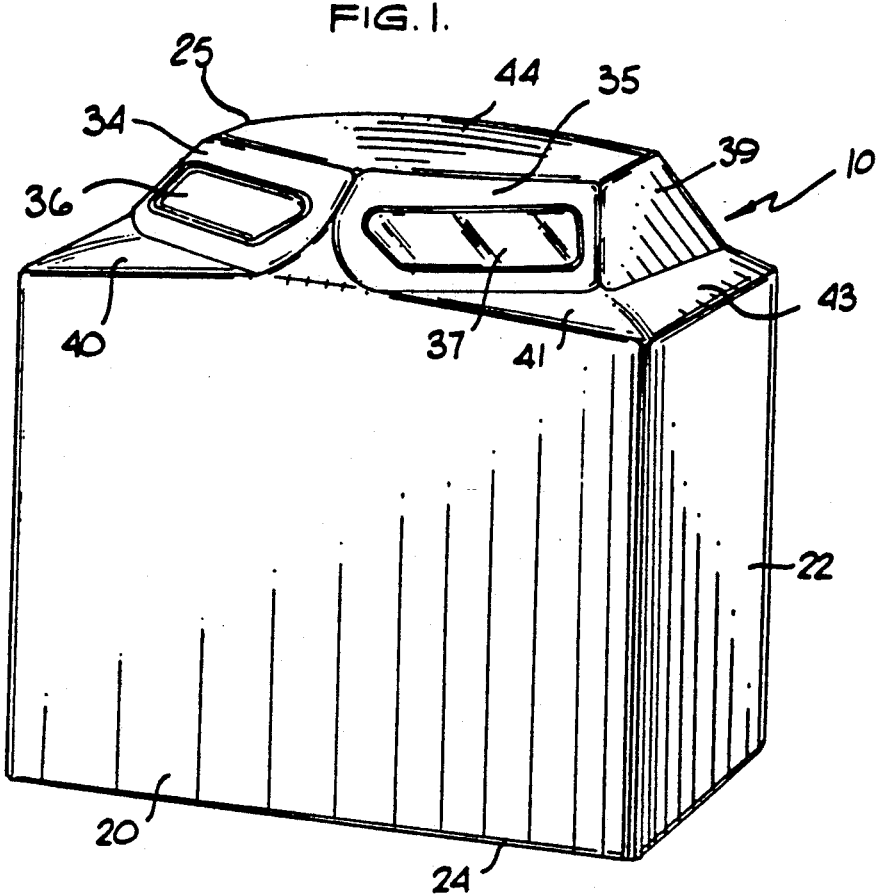
FIG. 1 is a front side perspective view of a sleeping cab unit of the present invention.
Figure 2:
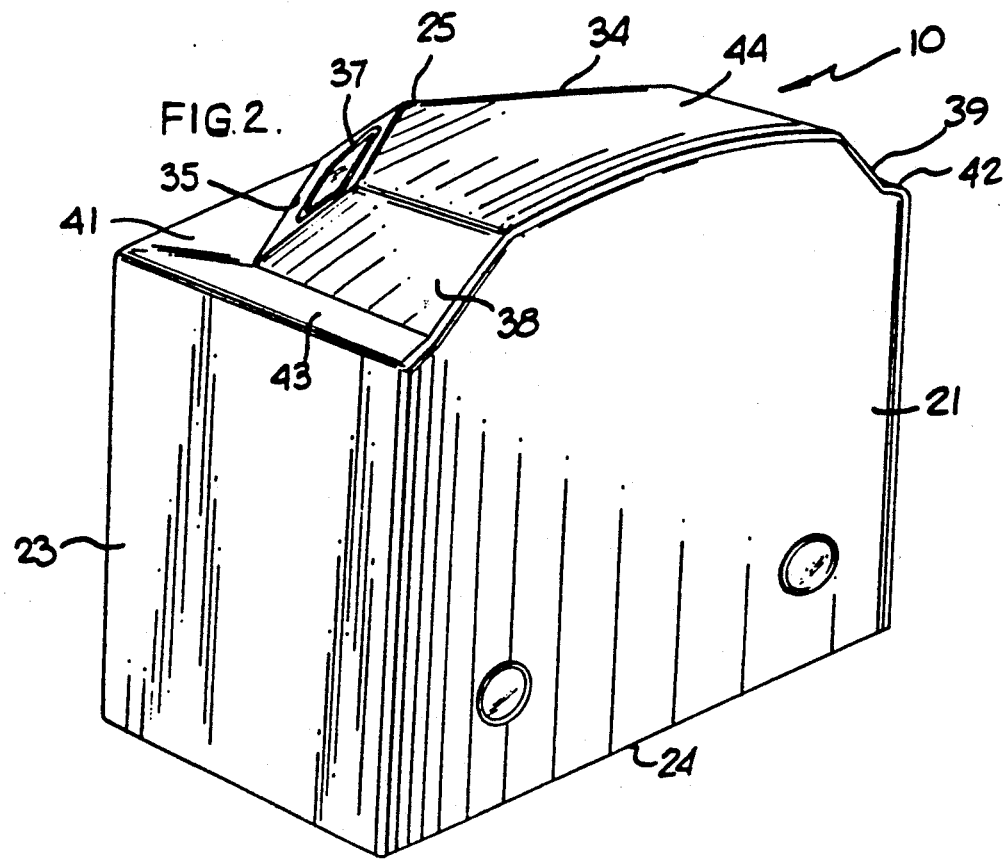
FIG. 2 is another rear side perspective view of the sleeping cab unit.

In general, as shown in FIGS. 1-3, the sleeping cab unit 10 of the present invention is mounted on the truck frame 12 behind and adjacent the rear wall 14 of the truck operation cab 16. Sleeping cab unit 10 comprises a front side wall portion 20, a rear side wall portion 21, side wall portions 22, 23, a bottom floor wall portion 24, and an upper roof wall portion 25. The side wall portions 20, 21, 22, 23 may be upwardly tapered to increase rigidity.

An entry door 30 may be provided in on side wall portion and window units 32 may be provided in any of the side wall portions. The upper roof portion 25 may be flat or have a dome-shape construction comprising V-shape inclined uppermost front wall portions 34, 35 with window units 36, 37; inclined uppermost side wall portions 38, 39; lowermost inclined side wall portions 40, 41, 42, 43; and a flat or curved upper wall portion 44.

The sleeping cab unit is manufactured by first forming a closed box-like shell as a complete solid wall enclosure without any seams or openings. Door and window openings are subsequently cut through the walls and doors and windows are mounted therein in sealed relationship thereto. The shell has a continuous integrally connected one-piece outer wall formed by a layer of fiberglass reinforced plastic material (FRP) such as polyester resin with chop strand mat or unidirectional mat, having a wall thickness of approximately between 0.125 to 0.1875 inch. The bottom wall portion may be separately formed with upwardly, inwardly tapered side surfaces and placed within and integrally bonded to corresponding upwardly inwardly tapered side surface's of the side wall portions. As shown in FIGS. 4 and 6, the roof and floor portions have a core material such as a sheet 50 of balsa wood material laminated to the inside surfaces 52 of the roof and floor portions of the one-piece outer wall of FRP material. The interior surfaces 54 of the side wall portions of the FRP material have laterally spaced bracing strip members such as balsa wood firring strips 56, 58 laminated thereto. Balsa wood is presently preferred for the laminating material because it is lightweight and has sufficient porosity to enable the FRP material to penetrate and be integrally connected and rigidly bonded thereto as indicated by layer 60, FIG. 4. In a preferred embodiment, the balsa wood floor sheet material 50 has a thickness of ¾ inch, the roof sheet core material (not shown) has a thickness of ⅛ inch, and the side wall firring strips 56, 58 have a thickness of approximately ⅜ inch and a width of approximately 2 inches and are spaced on 1 foot center lines. It is contemplated that other kinds of core materials may be employed. For example, the side wall bracing strip members 56, 58 may be made of reinforced fibre glass plastic material and the floor sheet member 50 may be made of plywood or particle board or the like.

Figure 7:
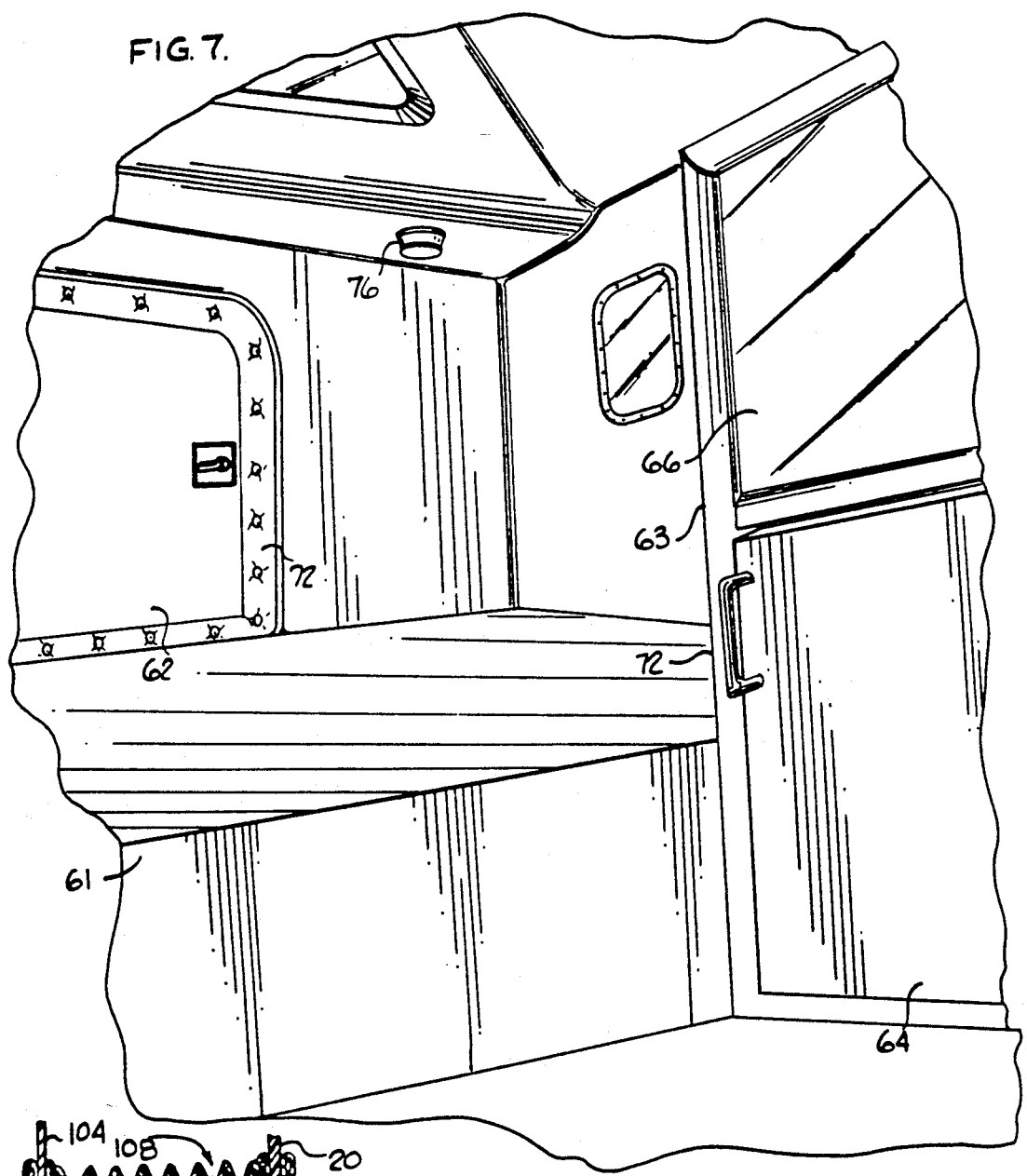
FIG. 7 is a partial perspective view of a finished portion of the interior of the sleeping cab unit.

After the basic unit has been manufactured, the door and window openings ar cut into the wall portions in accordance with any particular set of design specifications. Then the interior of the unit is finished in accordance with any particular design specifications. Air conditioning ducts, electrical wiring conduit, electrical outlets, electrical fixtures and the like (not shown) are fixedly mounted on the inside surfaces of the wall portions by bonding with fibreglass materials or other suitable adhesive type materials and/or by screws into the core materials. Internal structures, such as cabinets and shelves, are similarly fixedly mounted on the wall portions and core materials. For example, as shown in FIG. 7, a sleeping platform 61 for supporting a mattress may be mounted along the rear wall portion which may include an escape hatch 62. A support cabinet 63 for a refrigerator 64 and/or stove unit 66 may be mounted along a side wall portion. The inside surfaces of the portions are covered by suitable insulation and wall covering material.

In the presently preferred embodiment, FIGS. 4 and 5, a plastic foam material, such as styrene foam sheet material 70, is adhesively bonded to the inside wall surfaces. In an alternative embodiment, plastic foam material may be sprayed onto the surfaces. A wall covering material 71, FIG. 5, such as a plastic sheet material or panel members or padded upholstery material, is mounted over the core material and the insulation material by adhesive bonding and/or screw devices applied to the core material. The interior structures, such as cabinets and shelves and the like, are preferably covered with padded upholstery material 72 as shown in FIG. 7.

As shown in FIG. 6, the floor portion may be insulated and carpeted with a foam pad 73 and carpet 74. Electrical conduit and electrical wiring and electrical connections (not shown), and electrical fixtures such as lamps 76, FIG. 7, may be mounted between the paneling material and the side wall portions.

Figure 8:
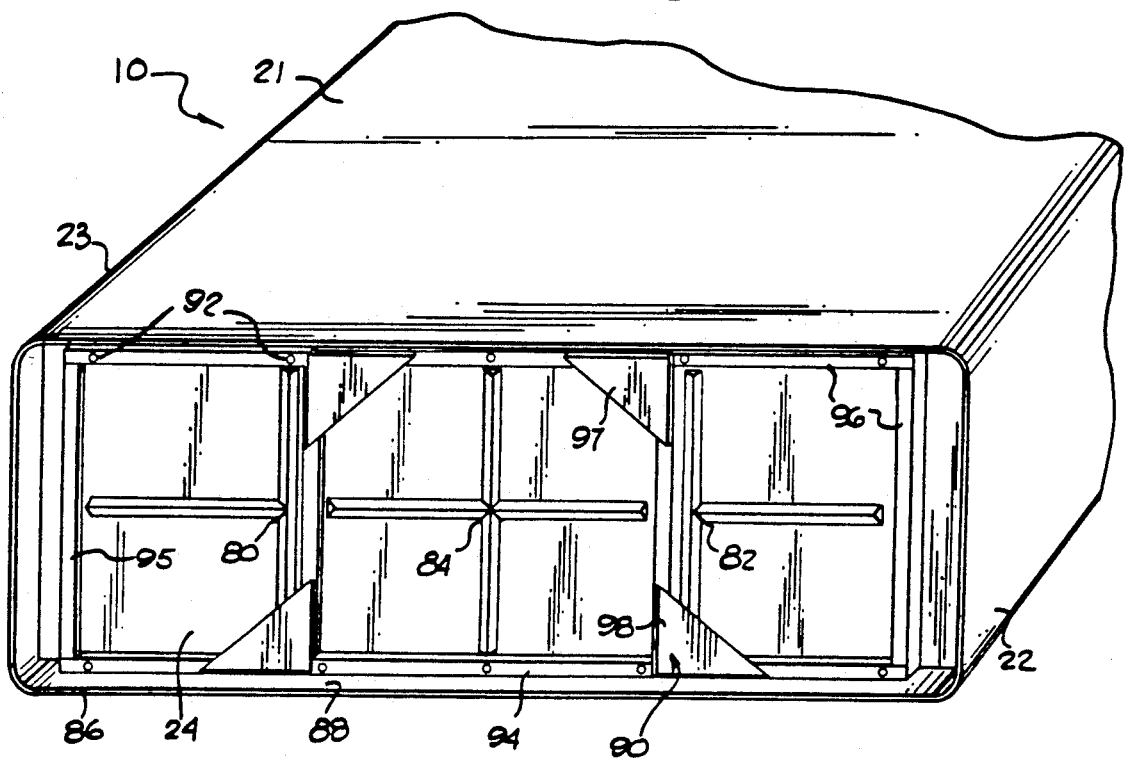
FIG. 8 is a bottom perspective view of a portion of the sleeping cab unit showing a mounting frame for mounting the sleeping cab unit on the truck frame.

As shown in FIG. 8, the bottom wall portion 24 is preferably provided with reinforcement rib means 80, 82, 84 and side wall portions 20, 21, 22, 23 extend downwardly beyond the lower surface of bottom wall portion 24 to provide a rim portion 86 defining a frame cavity 88. A rigid metallic frame means 90 is mounted in frame cavity 88 and fixed to the bottom wall portion 24 and floor core sheet portion 50 by suitable sealed bolt means 92. Frame means 90 comprises a central portion 94 having a width approximately equal to the width of the truck frame and wing portions 95, 96. Reinforcement plate means 97 and 98 are provided on the central frame portion.

Figure 9:
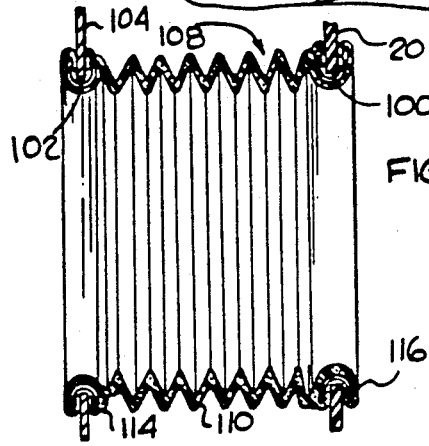
FIG. 9 is a cross-sectional view of tunnel means extending between a truck cab and the sleeping cab unit.
Figure 10:
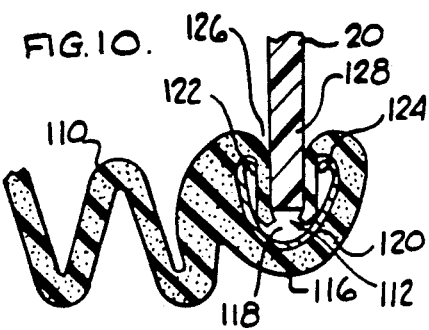
FIG. 10 is an enlarged cross-sectional view of connecting and sealing means associated with the tunnel means.

As shown in FIGS. 9 & 10, in a preferred embodiment of the invention, an access opening 100 is provided in the front sleeping cab wall portion 20 for location opposite a corresponding opening 102 in the rear wall portion 104 of the truck cab. These openings are connected by a tunnel means 108 made of a conventional resilient flexible pleated material, such as EDPM rubber material which is not subject to degradation by ultra violet light, solvents, or temperature variations, to enable a person to move directly between the truck cab to the sleeping cab. The tunnel means 108 has accordion-like pleats 110 to accommodate relative movement between the truck cab and the sleeping cab. Sealing and fastening means 112 are provided on end portions 114 and 116 in the form of a groove 118 which receives a clamping member 120 made of spring steel material with lip portions 122, 124 defining a groove 126 for reception of the wall edge portion 128. The construction and arrangement is such as to provide an elongated tunnel member having a wall portion made of flexible plastic material and an elongated crawl passage extending therethrough between opposite end openings. A flexible annular rib portion is on and extends about each end of the tunnel member and surrounding each of the end openings and an annular mounting groove is in and extends around each rib portion. A resilient annular clip means is mounted in each annular mounting groove and is resiliently retained therein and has a pair of opposed annular spring finger portions for gripping the side wall surfaces about the tunnel wall openings. The tunnel member has pleats extending therealong. Each annular mounting groove has a C-shape cross-section and the clip means has a corresponding larger size C-shape cross-section so as to compress the rib portion against the clip means. The spring finger portions of the clip means have reversely bent terminal portions and the rib means has corresponding reversely bent lip portions which cover said terminal portions. The spring finger portions of the clip means have reversely bent terminal portions and the rib means have corresponding reversely bent lip portions which cover the terminal portions.

Thus, the present invention comprises a self-contained cab sleeper unit attachment for trucks of all types. The basic construction consists of a one-piece box type outer shell constructed of laminated F.R.P. material and core materials of either balsa wood or other materials which equal or exceed balsa wood characteristics. Sheet core materials are placed on the ceiling and floor. Side walls have wood firring strips laminated to the walls for increased rigidity and to facilitate the installation of the interior insulation, finish and appointments. While the construction is particularly well suited for manufacture of a sleeper cab unit for a truck or the like, the construction may be employed for manufacture of similar type units for other purposes.

The outer shell of the sleeper unit is of one-piece construction with no seams or separately attached wall pieces. The physical size and shape of the unit can be adjusted to meet any requirements or specifications. In case of damage, the F.R.P. laminate has inherent memory capabilities and is inclined to retain its shape. It will not migrate as will metal. F.R.P. laminate does not fatigue or stress as will metal construction. All sides and curves of the unit are smooth-flowing with no air traps to disturb the airflow. Solid color finishes can be impregnated into the outside finish of the shell or be painted.

The sleeper cab comprises a front wall portion, a rear wall portion and a pair of side wall portions, and a bottom wall portion. The front wall portion has a peripheral configuration substantially the same as the peripheral configuration of the truck cab rear wall.

Advantages of the one-piece design are that water and air leakage problems inherent with all other present designs are eliminated. The use of similar or dissimilar material attachments to complete the construction is eliminated. The problems that occur with the use of pop rivets and the expansion and contraction of dissimilar materials are no longer a factor and the possibilities of leaks cannot occur. The bonding of the core material into the structure creates the following advantages over present construction methods: (1) greatly increased strength; (2) reduction in weight; (3) sound attenuation; and (4) insulation qualities that are bonded into place. The inside floor plan, doors, windows and inside appointments can be customized to the customers' specifications. The completed assembly can be attached to the truck cab with no water or air leaks and still maintain easy access to and from the cab. Completed assemblies are approximately 30 to 50% lighter than conventional designs. Maintenance time is reduced and excellent appearance is achieved with minimal effort.

The inventive concepts have been disclosed in connection with illustrative and preferred embodiments may be variously otherwise employed in alternative embodiments, and it is intended that the appended claims be constructed to include modifications, except insofar as limited by the prior art.

What is claimed is:

1. A sleeper cab unit for use with a tractor-truck, having a tractor-truck operating cab, and adapted to be mounted adjacent and behind the tractor-truck operating cab by attachment to the truck frame and the sleeper cab unit comprising:
   at least four outermost peripheral vertical side wall portions and an upper roof wall portion made of one piece of continuously integrally connected seamless molded fiberglass reinforced plastic material providing a continuous wall and connected to a lower floor portion made of one piece of molded fiberglass reinforced plastic material and defining an enclosed box-like structure having continuous interior side surfaces and exterior side surfaces extending along said vertical side wall portions and said upper roof wall portion;
   a plurality of laterally spaced separate reinforcement strip members integrally bonded to the interior side surfaces of said vertical side wall portions;
   a separate flat rigid reinforcement sheet member integrally bonded to the interior surface of said floor portion;
   cut-out opening means cut through said continuous wall in at least one of said vertical side wall portions for providing an access opening;
   a closure unit mounted in each of said cut-out opening means in sealed supporting relationship with said one of said vertical side wall portions; and
   mounting means for fixedly mounting the sleeper cab unit on the truck frame behind and adjacent the truck cab.

2. The invention as defined in claim 1 and wherein: said reinforcement strip members and said sheet reinforcement members are made of a porous lightweight material.

3. The invention as defined in claim 2 and wherein: said porous lightweight material is one piece of wood sheet material.

4. The invention as defined in claim 3 and wherein: said porous lightweight material is balsa wood.

5. The invention as defined in claim 1 and wherein: said separate reinforcement strip members are made of fiberglass material.

6. The invention as defined in claim 2 and further comprising:
   a bunk means mounted inside said box-like structure and being fixedly attached to a portion of said continuous wall by integral bonding therewith for providing a sleeping area.

7. The invention as defined in claim 6 and further comprising:
   cabinet means mounted inside said box-like structure and being fixedly attached to a portion of said continuous wall by integral bonding therewith for providing a storage space.

8. The invention as defined in claim 1 and further comprising:
   insulation material means mounted on the interior surfaces of said side wall portions and said roof portion by integral bonding therewith for providing a layer of insulation material thereover.

9. The invention as defined in claim 8 and wherein: said insulation material means comprises a foam plastic material.

10. The invention as defined in claim 9 and wherein: said insulation material means comprises a spray coated foam plastic material.

11. The invention as defined in claim 8 and further comprising:
    a cover material mounted over said insulation material means for providing a finished interior surface.

12. The invention as defined in claim 1 and further comprising:
    a layer of insulation material mounted on said reinforcement sheet member on said floor portion; and
    a layer of carpet material mounted on said layer of insulation material.

13. The invention as defined in claim 12 and further comprising:
    a layer of insulation material integrally bonded to the interior surface of said roof portion; and
    a covering material integrally bonded to said layer of insulation material.

14. The invention as defined in claim 13 and wherein said roof portion comprising:
    a pair of forwardly facing rearwardly outwardly and upwardly inclined intersecting front wall portions providing a V-shape front roof section.

15. The invention as defined in claim 14 and further comprising:
    a cut-out window opening in each of said inclined wall portions; and
    a window unit mounted in each cut-out window opening in sealed supporting relationship with said continuous wall.

16. The invention as defined in claim 14 and wherein said roof portion further comprising:
    a pair of upwardly inclined laterally oppositely spaced wall portions extending rearwardly from said intersecting front wall portions.

17. The invention as defined in claim 16 and wherein said roof portion further comprising
    a convexly outwardly curved uppermost wall portion connecting said intersecting front wall portions and said oppositely spaced wall portions.

18. The invention as defined in claim 1 and further comprising:
    a cut-out forwardly facing tunnel opening cut through said continuous wall in a front side wall portion adjacent a truck cab rear wall portion of the truck cab and being located opposite a rearwardly facing tunnel opening in the truck cab rear wall; and a tunnel means connected to and extending between the truck cab rear wall and the front side wall portion of the sleeping cab unit for enabling movement of a person therebetween through said tunnel means.

19. The invention as defined in claim 18 and wherein said tunnel means comprising:

an elongated tubular member made of flexible material having an elongated passage therewithin and oppositely spaced openings at each end thereof; and attachment means associated with said openings for attachment to said truck cab rear side wall and to said sleeping cab front side wall about the tunnel openings therein.

20. The invention as defined in claim 19 and wherein: said tubular member being made of pleated rubber material.

21. The invention as defined in claim 20 and wherein said attachment means comprising:

a rib portion at each end of said tubular member having an annular groove therein; and a resilient metallic clip member mounted in said groove and having a pair of resilient spring finger portions adapted to grippingly engage the truck cab rear side wall and the sleeping cab front side wall around the tunnel openings therein.

22. The invention as defined in claim 1 and wherein said mounting means comprising:

reinforcement rib means in said floor wall portion; and a rigid metallic frame member fixedly mounted on said floor wall portion.

23. The invention as defined in claim 22 and further comprising:

a frame cavity in the bottom portion of said sleeping cab unit defined by said floor portion and said side wall portions; and said frame member having a size and shape corresponding to and being mounted within said frame cavity and having a central portion for attachment to the truck frame and wing portions for supporting portions of the sleeping cab unit extending laterally beyond the truck frame.

24. The invention as defined in claim 1 and wherein said box-like structure comprises:

a front wall portion, a rear wall portion, a pair of side walls portions;

said front wall portion having a peripheral configuration substantially the same as the peripheral configuration of the truck cab rear wall;

said roof portion and said rear wall portion extending above the roof of the truck cab; and said roof portion including a dome-shape uppermost wall portion, a pair of intersecting rearwardly inclined forwardly facing wall portions, and a pair of upwardly inclined wall portions.

* * * * *